United States Patent
Sheikman et al.

(10) Patent No.: US 8,674,707 B2
(45) Date of Patent: Mar. 18, 2014

(54) SENSOR ASSEMBLIES USED TO DETECT THE PROXIMITY OF A MATERIAL TO A MICROWAVE ELEMENT

(75) Inventors: Boris Leonid Sheikman, Minden, NV (US); Sherrie Ann Clark, Minden, NV (US); Susan Lee Roush, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 13/164,835

(22) Filed: Jun. 21, 2011

(65) Prior Publication Data

US 2012/0326731 A1   Dec. 27, 2012

(51) Int. Cl.
*G01R 27/04* (2006.01)
*G01R 27/06* (2006.01)

(52) U.S. Cl.
USPC ............................ 324/644; 324/642; 324/637

(58) Field of Classification Search
USPC ......... 324/642, 637, 629, 635, 644, 661, 662, 324/699, 716; 702/97, 149, 155, 158, 127; 340/539.23, 686.6; 361/179; 73/1.79
See application file for complete search history.

(56) References Cited

U.S. PATENT DOCUMENTS

| | | | |
|---|---|---|---|
| 3,927,369 A | 12/1975 | Billeter et al. | |
| 4,458,530 A * | 7/1984 | Bastida | 73/290 R |
| 5,361,034 A * | 11/1994 | Pierce et al. | 324/663 |
| 5,688,050 A * | 11/1997 | Sterzer et al. | 374/122 |
| 5,804,801 A * | 9/1998 | Lauf et al. | 219/759 |
| 7,255,002 B2 * | 8/2007 | Gravel et al. | 73/290 V |
| 7,737,880 B2 | 6/2010 | Vacanti | |
| 8,244,287 B2 * | 8/2012 | Hozouri et al. | 455/500 |
| 8,373,516 B2 * | 2/2013 | Hernandez | 333/1.1 |
| 2010/0268218 A1 * | 10/2010 | Ormsby et al. | 606/33 |
| 2012/0029359 A1 * | 2/2012 | Sterzer et al. | 600/474 |

* cited by examiner

*Primary Examiner* — Hoai-An D Nguyen
(74) *Attorney, Agent, or Firm* — Fletcher Yoder, P.C.

(57) ABSTRACT

Sensor assemblies used to detect the proximity of a material to a microwave element are disclosed. One example sensor assembly includes a signal generator configured to generate at least one microwave signal, a coupler connected to the signal generator, a microwave element coupled to the coupler, and a processing module connected to the coupler. The microwave element is configured to generate an electromagnetic field as a function of said at least one microwave signal. The microwave element is structured to reflect a loading signal to said coupler when a material interacts with the electromagnetic field. The processing module is configured to process the loading signal with a reference signal to generate a data signal representative of the proximity of the material to the microwave element. The data signal defines a sub-microwave frequency.

20 Claims, 2 Drawing Sheets

US 8,674,707 B2

SENSOR ASSEMBLIES USED TO DETECT THE PROXIMITY OF A MATERIAL TO A MICROWAVE ELEMENT

BACKGROUND OF THE INVENTION

The present application relates generally to sensor assemblies and, more particularly, to sensor assemblies used to detect the proximity of a material to a microwave element.

At least some known sensor systems are used to detect the proximity of materials, such as metals, liquids, or other substance variations. The proximity of the material to a sensor may be used in various applications, such as monitoring systems and/or control systems. For example, such detection methods may be used to detect vibration and/or a position of a material in various systems such as, but not limited to, manufacturing systems, monitoring systems, processing systems, chemical systems, and/or safety systems.

Known detection methods may be performed using eddy current sensors, magnetic pickup sensors, or capacitive sensors. However, because the measuring range of such sensors is generally limited, the locations and environments that such sensors may be used are also generally limited. Moreover, because the frequency response of such sensors is generally low, the accuracy of such sensors may be limited. As such, the benefits of known detection systems may be limited.

BRIEF DESCRIPTION OF THE INVENTION

In one embodiment, a sensor assembly is disclosed. The sensor assembly includes a signal generator configured to generate at least one microwave signal, a coupler connected to the signal generator, a microwave element coupled to the coupler, and a processing module connected to the coupler. The microwave element is configured to generate an electromagnetic field as a function of said at least one microwave signal. The microwave element is structured to reflect a loading signal to said coupler when a material interacts with the electromagnetic field. The processing module is configured to process the loading signal with a reference signal to generate a data signal representative of the proximity of the material to the microwave element. The data signal defines a sub-microwave frequency.

In another embodiment, a power system is disclosed. The power system includes a component, at least one sensor assembly disposed adjacent to said component, and an electrical device coupled to the at least one sensor assembly. The at least one sensor assembly includes a coupler, a microwave element coupled to the coupler, and a processing module coupled to the coupler. The microwave element is configured to generate an electromagnetic field as a function of at least one microwave signal. The microwave element is configured to reflect a loading signal to said coupler when a material interacts with the electromagnetic field. The processing module is configured to process the loading signal with a reference signal to generate a data signal representative of the proximity of the material to the microwave element. The data signal defines a frequency below at least about 30 kHz.

In yet another embodiment, a method for use in detecting a proximity of a material is disclosed. The method includes generating, at a microwave element, an electromagnetic field as a function of at least one microwave signal, detuning the microwave element when a material interacts with the electromagnetic field to induce a loading signal to the microwave element, and generating, at a processing module, a data signal from the loading signal and a reference signal. The data signal is representative of the proximity of the material to the microwave element. The data signal defines a sub-microwave frequency.

DETAILED DESCRIPTION OF THE INVENTION

Exemplary methods and assemblies described herein overcome at least some disadvantages associated with known sensor systems used to detect the proximity of a material. In particular, embodiments described herein provide assemblies that may be used for detecting the proximity of a material to a microwave element, while providing a sub-microwave frequency data signal representative of the proximity of the material. The following description illustrates several embodiments by way of example and not by way of limitation.

Figure 1:
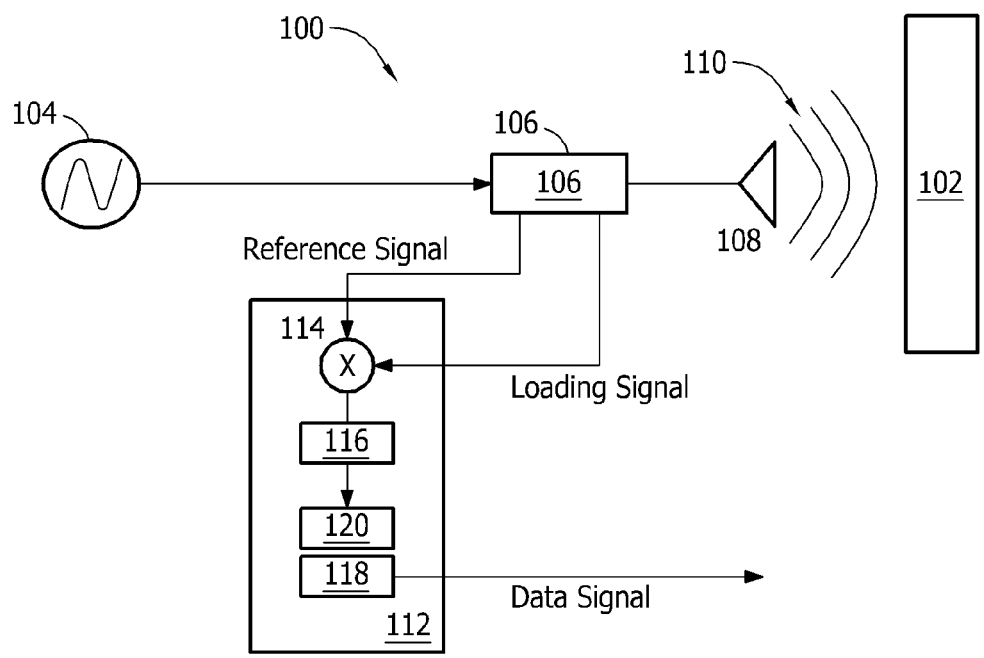
FIG. 1 is a block diagram of an exemplary sensor assembly that may be used to detect the proximity of a material.

FIG. 1 illustrates an exemplary sensor assembly 100 that may be used to detect the proximity of a material 102. In the exemplary embodiment, material 102 may be a liquid, a solid such as a metal, and/or any other product or material that interacts with the sensor assemblies described herein. As should be apparent, methods and sensor assemblies described herein are not limited to any one particular application and/or system, and one of ordinary skill in the art will appreciate that methods and sensor assemblies described herein may be used in connection with various applications, machines, and/or systems, such as, but not limited to, gas turbine engines, as indicated below.

In the exemplary embodiment, sensor assembly 100 includes a signal generator 104 and a coupler 106 that is coupled to signal generator 104. It should be noted that, as used herein, the terms "connected" and "coupled" are not limited to a direct mechanical and/or an electrical connection between components, but may also include an indirect mechanical and/or electrical connection between multiple components. Signal generator 104 is configured to generate at least one electrical signal at a microwave frequency (hereinafter referred to as a "microwave signal"). Moreover, sensor assembly 100 includes a microwave element 108, such as, without limitation, a microwave emitter, a microwave antenna, or other suitable microwave device. Microwave element 108 is connected to coupler 106. In the exemplary embodiment, microwave element 108 generates an electromagnetic field 110 as a function of the microwave signal generated by signal generator 104. As used herein, the term "microwave" refers to a signal or a component that receives and/or transmits signals having frequencies between about 300 Megahertz (MHz) and about 300 Gigahertz (GHz). For example, a microwave signal may have a frequency of 3.25 GHz or 5.8 GHz.

Through use of microwave element 108, a detection range of sensor assemblies described herein and used to detect the proximity of material 102 to microwave element 108 may be substantially extended as compared to known eddy current sensors, magnetic pickup sensors, or capacitive sensors currently used to detect the proximity of a material. Moreover, by using microwave element 108, locations and/or positions at which sensor assemblies described herein are far less limited as compared to known eddy current sensors, magnetic pickup sensors, and/or capacitive sensors. Moreover, because the frequency response is higher for microwave element 108 as compared to known sensors, sensor assemblies 100 described herein may provide more accurate measurements than the known sensor assemblies.

Sensor assembly 100 includes a processing module 112 connected to coupler 106. In the exemplary embodiment, processing module 112 includes a frequency mixer 114 and a filter 116 connected to frequency mixer 114.

During operation, signal generator 104 generates a microwave signal that is equal to, and/or approximately equal to, a resonant frequency of microwave element 108. Signal generator 104 transmits the microwave signal to coupler 106. Coupler 106, in turn, transmits the microwave signal to microwave element 108. Additionally, in this particular embodiment, coupler 106 transmits a reference signal to processing module 112. More specifically, coupler 106 transmits the reference signal, which is derived from and that is approximately equal to, the microwave signal, to frequency mixer 114. In other embodiments, a reference signal may be different from a microwave signal.

As the microwave signal is transmitted through microwave element 108, an electromagnetic field 110 is emitted outward from microwave element 108. If a material, such as material 102, enters electromagnetic field 110, an electromagnetic coupling may occur between material 102 and electromagnetic field 110. Because of the presence of material 102 within electromagnetic field 110, electromagnetic field 110 is disrupted because of an induction and/or capacitive effect within material 102 that may cause at least a portion of electromagnetic field 110 to be inductively and/or capacitively coupled to material 102 as an electrical current and/or charge. In such an instance, microwave element 108 is detuned (i.e., a resonant frequency of microwave element 108 is reduced and/or changed, etc.) and loading is induced to microwave element 108. The loading induced to microwave element 108 causes a reflection of the microwave signal within microwave element 108 and coupler 106 (hereinafter referred to as a "loading signal") to be transmitted through coupler 106 to processing module 112. The loading signal is representative of the proximity of material 102 to microwave element 108, which may indicate the presence of material 102 within electromagnetic field 110 and/or the distance of material 102 away from microwave element 108.

Because of material 102, the induced loading signal has a lower power amplitude and/or is at a different phase than the power amplitude and/or the phase of the microwave signal supplied to microwave element 108 from signal generator 104. More generally, the loading signal is substantially the same as the microwave signal, except for the effects of material 102 on electromagnetic field 110. Accordingly, a difference between the microwave signal and the loading signal is representative of the proximity of material 102 to microwave element 108.

The loading signal is transmitted through coupler 106 to processing module 112. In turn, processing module 112 receives and processes the loading signal, in combination with the reference signal, to generate a data signal that is representative of the proximity of material 102 to microwave element 108. The data signal defines a sub-microwave frequency.

More specifically, frequency mixer 114 causes a shift of the frequency of the loading signal based on a frequency of the reference signal, or vice-versa. In the exemplary embodiment, frequency mixer 114 adds and subtracts the frequency of the loading signal (fl) and the frequency of the reference signal (fr). Accordingly, frequency mixer 114 provides a data signal in two frequency bands, i.e., an up-conversion band (fl+fr) and a down-conversion band (fl−fr). The resulting frequency of the up-conversion band is not less than a microwave frequency. Conversely, the resulting frequency of the down-conversion band is substantially nominal, thereby providing a substantially DC data signal. More generally, the reference signal and the loading signal are substantially the same, except for the effects of material 102 on electromagnetic field 110. As should be appreciated by those skilled in the art, physical movement of material 102 into, out of, and/or within electromagnetic field 110 generally occurs well below 300 MHz, resulting in a frequency below 300 MHz, i.e., a sub-microwave frequency.

In the exemplary embodiment, sensor assembly 100 is able to achieve the range and/or frequency response provided by microwave element 108, while permitting simplified post-processing of the sub-microwave frequency data signal. More specifically, by using frequency mixer 114 to provide a data signal within a sub-microwave frequency band, the sensor assemblies described herein may significantly simplify processing, handling, and/or transmitting of the data signal. In various embodiments, for example, a wider variety of components rated for sub-microwave frequency signals may be commercially available to operate on the data signal. Further, according to the present disclosure, complexity and/or cost of board-level circuits to process, filter, and/or transmit the sub-microwave frequency data signal band may be reduced.

Referring again to FIG. 1, filter 116 is coupled between frequency mixer 114 and a signal processor 118. In the example embodiment, filter 116 is a low-pass filter structured to attenuate signals above 30 kHz, and consequently pass signals having a frequency below 30 kHz. During operation, low-pass filter 116 therefore passes the data signal from frequency mixer 114 in the down-conversion frequency band, while attenuating the data signal in the up-conversion frequency band. Filter 116 provides a filtered data signal, including substantially only the data signal at the down-conversion frequency band. It should be appreciated that in other embodiments, a low-pass filter or other filter may be structured to pass signals at one or more frequencies while attenuating signals at other frequencies.

Signal processor 118 determines a proximity of material 102 to microwave element 108 as a function of the filtered data signal. Signal processor 118 outputs a processed data signal indicative of the proximity. Signal processor 118 executes a function for processing the data signal to provide a proximity of material 102 to microwave element 108. The function may be linear or a high order polynomial. The function may be representative of calibration testing for each individual sensor assembly completed during manufacturing, to improve and/or ensure accuracy of the sensor assembly. The function is stored in signal processor 118. Signal processor 118 includes an analog-to-digital (A/D) converter 120 for converting the filtered data signal to a digital data signal, such that signal processor 118 may process the digital data signal.

Although illustrated and described as included in processing module 112, it should be appreciated that signal processor 118 and/or A/D converter 120 may include another module, positioned adjacent to, and/or remote from, processing module 112 in other embodiments. In yet other embodiments, either of signal processor 118 and/or A/D converter 120 may be omitted, and/or another component may be included in processing module 112 to enable the data signal to be processed, filtered, and/or transmitted as described herein.

Figure 2:
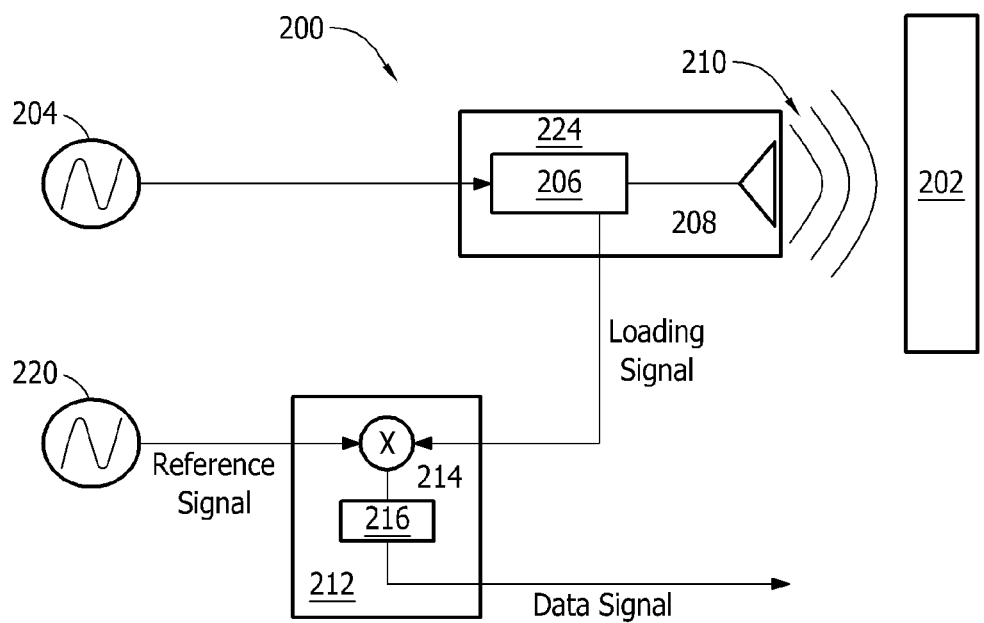
FIG. 2 is a block diagram of an alternate sensor assembly that may be used to detect the proximity of a material.

FIG. 2 illustrates an exemplary sensor assembly 200 that may be used to detect the proximity of a material 202. Sensor assembly 200 includes a signal generator 204, a coupler 206 connected to signal generator 204, and a microwave element 208 coupled to coupler 206. Sensor assembly 200 includes a processing module 212 coupled to coupler 206. More specifically, coupler 206 is coupled to a frequency mixer 214 included in processing module 212. During operation, consistent with sensor assembly 100, coupler 206 transmits a loading signal to frequency mixer 214.

In the exemplary embodiment, sensor assembly 200 includes a reference signal generator 220. Reference signal generator 220 is coupled to frequency mixer 214. The reference signal may be substantially equal to the microwave signal generated by signal generator 204. Conversely, the reference signal may be different than and not substantially equal to the microwave signal generated by signal generator 204. As described above with reference to FIG. 1, during operation, frequency mixer 214 provides a data signal at a down-conversion band and at an up-conversion band. The down-conversion band is generally positioned at the difference between the loading signal frequency and the reference signal frequency. Accordingly, the reference signal may be selected to provide the data signal, at any desired frequency. For example, if the microwave signal defines a frequency of about 5.80 GHz and the reference signal defines a frequency of about 5.79 GHz, the down-conversion band is present substantially at about 10.0 Mhz.

It should be appreciated that various different microwave frequencies and/or reference signal frequencies may be selected to locate a data signal at any desired frequency. More specifically, frequency of the microwave signal and/or the loading signal may be adjusted or selected to further limit a frequency of a data signal to below any desired value, such as about 200 MHz, about 100 MHz, about 100 kHz, about 30 kHz, about 20 kHz, about 5 kHz, about 1 kHz, and/or other suitable frequency, including any discrete sub-microwave frequency, etc. Frequency of the data signal may be selected, possibly based on one or more environmental constraints, sensor assembly requirements and/or desired components for processing, filtering, and/or transmitting the data signal.

As should be apparent, filter 216 may be selected depending on the location of a down-conversion band. Specifically, for example, if a data signal defines a frequency of 20 kHz, filter 216 may be a band-pass or notch filter. Notch filter 216 may define a center frequency at 20 kHz, with a sufficient bandwidth to ensure that the data signal in the down-conversion band is passed without more than nominal attenuation, while the up-conversion band is consistently effectively attenuated. Further, filter 216 may act to filter noise and/or other artifacts included in the data signal, but outside the bandwidth of filter 216.

Referring again to FIG. 2, sensor assembly 200 includes a probe housing 224. As shown, each of coupler 206 and microwave element 208 are positioned within probe housing 224. Probe housing 224 may be structured to facilitate transmission of electromagnetic field 210 and/or mounting in a particular location, machine, and/or system.

Further, as shown in FIG. 2, processing module 212 does not include a signal processor and/or an A/D converter. Accordingly, the data signal is an analog signal, which may be used by another device to determine the proximity of material 202 to microwave element 208, including the existence of material 202 within electromagnetic field 210 and/or a distance between material 202 and microwave element 208.

Figure 3:
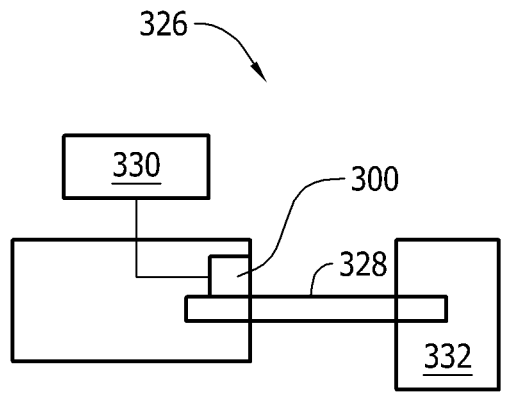
FIG. 3 is a block diagram of an exemplary power system.

Methods and assemblies described herein may be employed in various applications. Exemplary applications may include, without limitation, control systems, monitoring systems, operating systems, safety systems, and/or diagnostic systems. An exemplary power system 326 is illustrated in FIG. 3. Power system 326 includes a component 328, at least one sensor assembly 300 disposed adjacent to component 328, and an electrical device 330 coupled to sensor assembly 300. Component 328 may include, but is not limited to, a gas turbine engine component, such as a rotating turbine shaft, turbine casing, a fuel, or other mobile or immobile component of a gas turbine engine, etc. In this particular embodiment, component 328 includes a rotating turbine shaft driving a load 332. In this exemplary embodiment, sensor assembly 300 is used to monitor component 328, including position, vibration and/or other behavior during operation. In particular, electrical device 330 includes a monitoring system to monitor component 328 and/or a control system to control component 328, as necessary, depending on monitored behaviors. For example, electrical device 330 may halt rotation of component 328, e.g., a rotating turbine shaft, if vibration (as monitored by sensor assembly 300) exceeds a predefined threshold.

Sensor assembly 300 may include one or more of the sensor assembly embodiments as described herein or other sensor assemblies consistent with one or more teachings of the present disclosure. In the exemplary embodiment, sensor assembly 300 provides a data signal electrical device 330 to control and/or monitor component 328.

In addition to the variety of applications of the present disclosure, methods and assemblies described herein may be used to detect the proximity of materials under a variety of conditions. In numerous exemplary embodiments, methods and assemblies may involve static detection and/or dynamic detection. Static detection may include, for example, detecting the proximity of a material to a microwave element to determine expansion and/or contraction of the material. Additionally, dynamic detection may include, for example, detecting the proximity of a material to a microwave element to detect movement of a machine component, e.g., vibration of the rotating turbine shaft.

Figure 4:
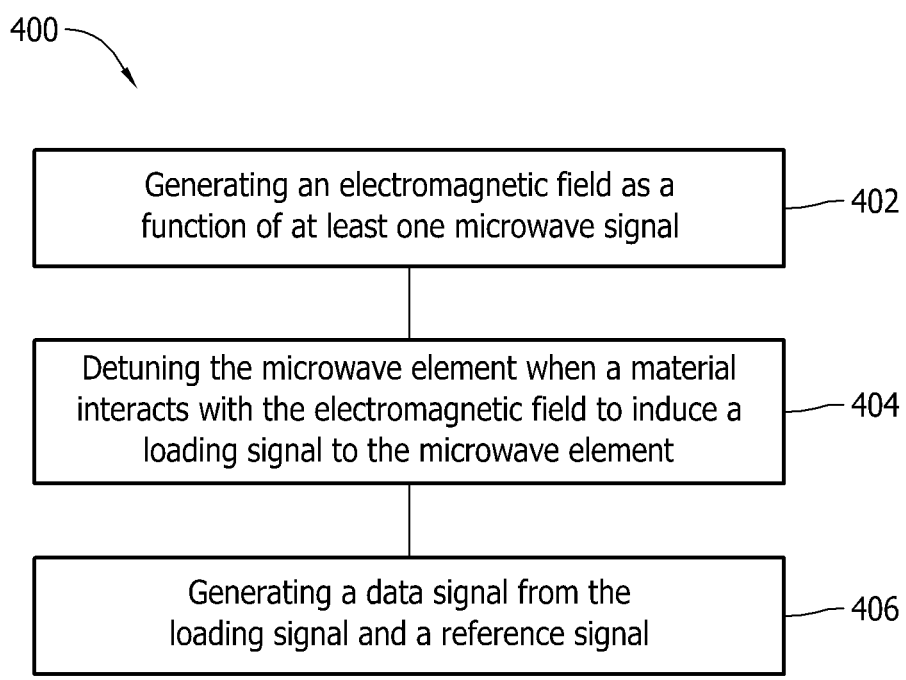
FIG. 4 is a flow chart of an exemplary method that may be used to detect the proximity of a material in accordance with the present disclosure.

FIG. 4 is an exemplary method 400 that may be used to detect the proximity of a material, such as material 102, shown in FIG. 1. Method 400 is described herein with reference to sensor assemblies described herein with reference to FIG. 1. It should be appreciated, however, that the methods described herein may be applied to a wide variety of sensor assemblies and therefore are not limited to the specific embodiments of sensor assemblies described herein. Conversely, sensor assemblies described herein should not be understood to be limited to the particular methods described herein.

In the exemplary embodiment, method 400 includes generating 402, at microwave element 108, electromagnetic field 110 as a function of at least one microwave signal, detuning 404 microwave element 108, when material 102 interacts with electromagnetic field 110 to induce a loading signal to microwave element 108, and generating 406, at processing module 112, a data signal from said loading signal and a reference signal. The data signal is representative of the proximity of material 102 to microwave element 108. The data signal defines a sub-microwave frequency.

Method 400 may also include converting the data signal to a digital signal and determining the proximity of material 102 to the microwave element 108 as a function of the digital data signal. Additionally, or alternatively, generating 406 the data signal may include frequency mixing the loading signal with the reference signal. Further, method 400 may include generating the reference signal such that the reference signal defines a frequency that is different than the at least one microwave signal.

The above-described embodiments provide efficient and cost-effective sensor assemblies for use in detecting the proximity of a material. In particular, the embodiments described herein provide a sensor assembly that detects the proximity of a material to a microwave element. The sensor assemblies may be included to provide a stress monitoring (e.g., a rotating turbine shaft), binary switch or counter, a dielectric monitor (e.g., submerge in one or more fluids to gauge electromagnetic response), a strain gauge (e.g., bending a microwave element formed on a flex substrate), and/or other suitable applications.

The sensor assembly embodiments described herein may include a substantially extended detection range as compared to known eddy current sensors, magnetic pickup sensors, or capacitive sensors currently used to detect the proximity of a material to a microwave element. Moreover, the location and/or position of sensor assemblies described herein may be far less limited as compared to known eddy current sensors, magnetic pickup sensors, and/or capacitive sensors. Further, because the frequency response is higher for a microwave element as compared to known sensors, sensor assemblies described herein may provide more accurate measurements than the known sensor assemblies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor assembly comprising:
a signal generator configured to generate at least one microwave signal;
a coupler connected to said signal generator;
a microwave element coupled to said coupler, said microwave element configured to generate an electromagnetic field as a function of said at least one microwave signal, wherein said microwave element is structured to reflect a loading signal to said coupler when a material interacts with the electromagnetic field; and
a processing module connected to said coupler, said processing module configured to process the loading signal with a reference signal to generate a data signal representative of the proximity of the material to the microwave element, wherein the data signal defines a sub-microwave frequency.

2. The sensor assembly of claim 1, wherein said processor module is configured to generate the data signal having frequency up to about 1 MHz.

3. The sensor assembly of claim 1, wherein said processing module comprises a frequency mixer configured to combine the loading signal with the reference signal.

4. The sensor assembly of claim 3, wherein said signal generator is coupled to said processing module, and wherein said reference signal is substantially equal to the at least one microwave signal.

5. The sensor assembly of claim 3, further comprising a reference signal generator coupled to said processing module, and wherein said processing module is configured to process the loading signal with said reference signal generated by said signal generator.

6. The sensor assembly of claim 5, wherein said signal generator is configured to generate the reference signal having a frequency between about 300 MHz and about 6.0 GHz.

7. The sensor assembly of claim 3, wherein said processing module comprises a signal processor and a low-pass filter coupled between said frequency mixer and said signal processor, said low-pass filter structured to attenuate frequencies at least above about 100 kHz.

8. The sensor assembly of claim 7, wherein said signal processor is configured to determine the proximity of the material to said microwave element as a function of the filtered data signal.

9. The sensor assembly of claim 1, wherein said coupler and said microwave element are enclosed in a single probe housing.

10. A power system comprising:
a component;
at least one sensor assembly disposed adjacent to said component, said at least one sensor assembly comprising:
a coupler;
a microwave element coupled to said coupler, said microwave element configured to generate an electromagnetic field as a function of at least one microwave signal, wherein said microwave element is configured to reflect a loading signal to said coupler when a material interacts with the electromagnetic field;
a processing module coupled to said coupler, said processing module configured to process the loading signal with a reference signal to generate a data signal representative of the proximity of the material to the microwave element, wherein the data signal defines a frequency below at least about 30 kHz; and
an electrical device coupled to said at least one sensor assembly.

11. The system of claim 10, wherein said microwave element comprises a microwave emitter, and wherein said electrical device comprises at least one of a control system and a diagnostic system.

12. The system of claim 11, wherein said processing module comprises an analog-to-digital converter configured to convert the data signal into a digital data signal, and a signal processor configured to determine the proximity of the material to said microwave element as a function of the digital data signal.

13. The system of claim 11, wherein said component comprises a turbine shaft.

14. A method for use in detecting a material, said method comprising:
generating, at a microwave element, an electromagnetic field as a function of at least one microwave signal;
detuning said microwave element when a material interacts with the electromagnetic field to induce a loading signal to the microwave element; and
generating, at a processing module, a data signal from the loading signal and a reference signal, wherein the data signal is representative of the proximity of the material to the microwave element, and wherein the data signal defines a sub-microwave frequency.

15. The method of claim 14, wherein the output signal defines a frequency up to about 100 MHz.

16. The method of claim 15, wherein the output signal defines a frequency up to about 20 kHz.

17. The method of claim 16, wherein said reference signal is approximately equal to the at least one microwave signal.

18. The method of claim 16, further comprising:
converting the data signal to a digital signal; and
determining the proximity of the material to the microwave element as a function of the digital data signal.

19. The method of claim 14, wherein generating the data signal comprises frequency mixing the loading signal with the reference signal.

20. The method of claim 14, further comprising generating the reference signal such that the reference signal defines a frequency that is different than the at least one microwave signal.

\* \* \* \* \*